(12) United States Patent  
Hofman

(10) Patent No.: US 8,570,377 B2  
(45) Date of Patent: Oct. 29, 2013

(54) SYSTEM AND METHOD FOR RECOGNIZING A UNIT LOAD DEVICE (ULD) NUMBER MARKED ON AN AIR CARGO UNIT

(75) Inventor: Yoram Hofman, Kefar Bialik (IL)

(73) Assignee: Hi-Tech Solutions Ltd., Yokneam (IL)

( * ) Notice: Subject to any disclaimer, the term of this patent is extended or adjusted under 35 U.S.C. 154(b) by 0 days.

(21) Appl. No.: 13/521,176

(22) PCT Filed: Jan. 11, 2011

(86) PCT No.: PCT/IL2011/000030  
§ 371 (c)(1),  
(2), (4) Date: Jul. 20, 2012

(87) PCT Pub. No.: WO2011/083479  
PCT Pub. Date: Jul. 14, 2011

(65) Prior Publication Data  
US 2012/0274784 A1 Nov. 1, 2012

Related U.S. Application Data

(60) Provisional application No. 61/293,780, filed on Jan. 11, 2010.

(51) Int. Cl.  
*H04N 5/225* (2006.01)

(52) U.S. Cl.  
USPC ........... 348/161; 348/143; 348/159; 348/169; 382/321

(58) Field of Classification Search  
USPC .................. 348/143, 159, 161, 169; 382/321  
See application file for complete search history.

(56) References Cited

U.S. PATENT DOCUMENTS

| | | | |
|---|---|---|---|
| 3,982,179 A * | 9/1976 | Forster | 324/245 |
| 5,945,825 A | 8/1999 | Clemens | |
| 2003/0190057 A1* | 10/2003 | Takehara et al. | 382/104 |
| 2009/0121085 A1 | 5/2009 | Hettwer | |
| 2009/0148037 A1* | 6/2009 | Moriyama et al. | 382/154 |
| 2009/0180683 A1* | 7/2009 | Lee et al. | 382/156 |
| 2009/0198371 A1 | 8/2009 | Emanuel et al. | |

* cited by examiner

*Primary Examiner* — Sath V Perungavoor  
*Assistant Examiner* — Jeffery Williams  
(74) *Attorney, Agent, or Firm* — Lowenstein Sandler LLP; Ariel Reinitz

(57) ABSTRACT

The present invention provides a system and method for recognizing a Unit Load Device (ULD) number marked on an air cargo unit. The system includes at least one camera configured to acquire images of the ULD number. It includes also a presence sensing module configured to detect a presence status of the air cargo unit in a scanning zone of the system, the presence status can have a value being one of present and absent, and a recognition processor coupled to the presence sensing module and to the at least one camera. The recognition processor is configured to obtain from the presence sensing module information relating to the presence status of said air cargo unit, to trigger the at least one camera to acquire the images upon a change in the value of the presence status, and to process the images for recognizing the ULD number.

19 Claims, 13 Drawing Sheets

SYSTEM AND METHOD FOR RECOGNIZING A UNIT LOAD DEVICE (ULD) NUMBER MARKED ON AN AIR CARGO UNIT

CROSS REFERENCE TO RELATED APPLICATIONS

This patent application is a National Stage Application under 35 U.S.C. 371 of International PCT Patent Application No. PCT/IL2011/000030, filed on Jan. 11, 2011, which claims the benefit of U.S. Patent Application Ser. No. 61/293,780, filed Jan. 11, 2010, which are hereby incorporated by reference in their entirety herein.

FIELD OF THE INVENTION

The invention relates to a method and apparatus for tracking air cargo. More specifically, it describes methods and systems for providing automatic character recognition for unit load devices.

BACKGROUND OF THE INVENTION

A "unit load device" or a "universal load device", referred to shortly as "ULD", is a unit used to load luggage, or freight onto an aircraft. ULDs come in two forms: pallets and containers. ULD pallets are rugged sheets, e.g. made of aluminum, with rims designed to lock onto cargo net lugs. ULD containers, also known as cans and pods, are closed containers, e.g., made of aluminum or combination of aluminum (frame) and polycarbonate resin (walls). Some containers may have built-in refrigeration units, for example. FIG. 1A presents a pallet, while FIG. 1B presents a container. Hereinafter, each ULD, either a container, a pallet or any other type of ULD, constitutes an "air cargo unit", or shortly, a "unit".

Air cargo units are loaded onto a cargo area of an aircraft. On their way from the aircraft to a loading station during unloading, or from the loading station to the aircraft during loading, the units are pulled by a tractor. The tractor can pull a number of units at the same time, including several containers, several pallets, or a combination thereof. While pulled by a tractor, the units are mounted on trolleys, e.g., with a single pallet or single or twin containers on each trolley. Using other words, a unit is carryable by a trolley. The tractor carries several such trolleys.

It is appreciated that units differ in size and shape in order to fit into the cargo area of the aircraft. Hence, there are different types of containers and pallets. Each unit has characteristic shape and dimensions.

All ULDs are identified by their "ULD number", sometimes referred to also as a "ULD identifier". A three-letter prefix identifies its type, followed by a 4 or 5 digit serial number (4 if prior to Oct. 1, 1993; either 4 or 5 if post Oct. 1, 1993) to uniquely identify it from others of the same type, and ending with a two character (alpha-numerical) suffix identifying the ULD's owner (if an airline, often the same as IATA, the International Air Transport Association designator codes). Generally, the prefix is of the form "UBC", wherein: U represents the ULD category (such as container or pallet); B represents the base dimensions (Latin letter); and C stands for Contour/Compatibility (Latin letter).

For example:
In "DQF0631R7" illustrated in FIG. 2A, the ULD number indicates that the unit is a container (U='D').
In "PMC 22106 MP", illustrated in FIG. 2B, U='P,' indicating that the unit is a certified aircraft pallet, B='M' (96"×125"), C='C'. The unique number is 22106, and its owner is Martinair, represented by "MP".

The necessity of monitoring and locating airborne cargo has been identified and dealt with before. For example, U.S. Pat. No. 7,198,227 ("Aircraft Cargo Locating System", Olin et al., published in 2007) discloses an aircraft cargo locating system that determines the location and weight of aircraft cargo placed in unit loading devices. A wireless tag, such as a Radio Frequency Identification (RFID) tag is affixed to each of the loading devices. The U.S. Pat. No. 7,198,227 system receives information from the tags, and from the information calculates the location of the loading devices and the weight of the loading devices.

U.S. Pat. No. 6,429,810 ("Integrated Air Logistics System", De Roche, published in 2002) discloses an autonomous cargo tracking system and method comprised of a communication and sensor unit that is affixed to the container to be tracked, a ground system that coordinates communications between the unit and the users, and one or more satellite systems that provide communication capabilities as well as position information.

In systems other than tracking air cargo, barcode scanning is used. For example, US 2010/0230328 ("Intelligent Barcode Systems", Bonnell et al., published in 2010) discloses systems and methods using intelligent barcodes for processing mail, packages, or other items in transport. It also discloses systems and methods allowing end-to-end visibility of a mail stream by uniquely identifying and tracking mail pieces. In one embodiment of US 2010/0230328, systems and methods using intelligent barcodes allow a mailing service to provide enhanced acceptance, sorting, tracking, address correction, forwarding, and delivery services.

Still in the Art, there are Optical Character Recognition (OCR) methods allowing scanning and processing alphanumeric characters. Such an OCR method is disclosed, for example, in US 2008/0131001 ("Multi-Level Neural Network Based Characters Identification Method and System", Hofman and Margolin, published in 2008), describing a system and a method, which enable automatic identification of characters while performing and calibrating data verification to ensure data reliability. The system described in US 2008/0131001 can process these identified characters, such as override adverse conditions, adjusting and correcting unclear characters and their images.

US 2008/0063280 ("Character Recognition System and Method", Hofman and Nikulin, published in 2008) discloses a system and method, which enables precise identification of characters contained in vehicle license plates, container I.D, chassis I.D., aircraft serial number and other such identification markings. The system can process these identified characters and operate devices, such as access control operations, traffic systems and vehicle and container tracking and management systems, and provide records of all markings together with their images.

However, presently existing ULD tracking methods require modifications to the unit load devices, such as affixing external modules to the units, for example, RFID tags, or such as changing the standard markings thereof, e.g., by embedding barcode identification in each unit. On the other hand, presently existing character recognition systems are not designed to manage unit load devices.

There is a need in the art, thus, for a mechanism that allows tracking of standard unit load devices.

SUMMARY OF THE INVENTION

It is therefore an object of the invention to provide a system and method for recognizing a unit load device (ULD) number marked on an air cargo unit.

The present invention provides a system for recognizing a Unit Load Device (ULD) number marked on an air cargo unit, the system comprising:

at least one camera configured to acquire images of said ULD number;

a presence sensing module configured to detect a presence status of said air cargo unit in a scanning zone of the system, the presence status can have a value being one of present and absent; and a recognition processor coupled to said presence sensing module and to said at least one camera, configured to obtain from said presence sensing module information relating to the presence status of said air cargo unit;

to trigger said at least one camera to acquire said images upon a change in the value of said presence status; and to process said images for recognizing the ULD number.

The invention further provides a method for recognizing a Unit Load Device (ULD) number marked on an air cargo unit, the method comprising:

obtaining information relating to a presence status of the air cargo unit in a scanning zone where an image of the air cargo unit can be acquired;

responsive to said information relating to the presence status, wherein the information indicates that the air cargo unit is present in the scanning zone, acquiring images of said scanning zone; and processing the images for recognizing the ULD number.

In addition, the invention provides a system for acquiring images of air cargo units having a Unit Load Device (ULD) number marking, the system comprising:

a camera configured to acquire the images, wherein the camera is placed in an angle and height correlated with an expected position of said ULD number marking on said air cargo unit.

Furthermore, the invention provides a lane for tracking a Unit Load Device (ULD) number marked on an air cargo unit, the system comprising:

at least one camera configured to acquire images of said ULD number; and a presence sensing module configured to detect a presence status of said air cargo unit in a scanning zone covering said lane, the presence status can have a value being one of present and absent;

wherein said at least one camera and said presence sensing module are coupleable to a recognition processor.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
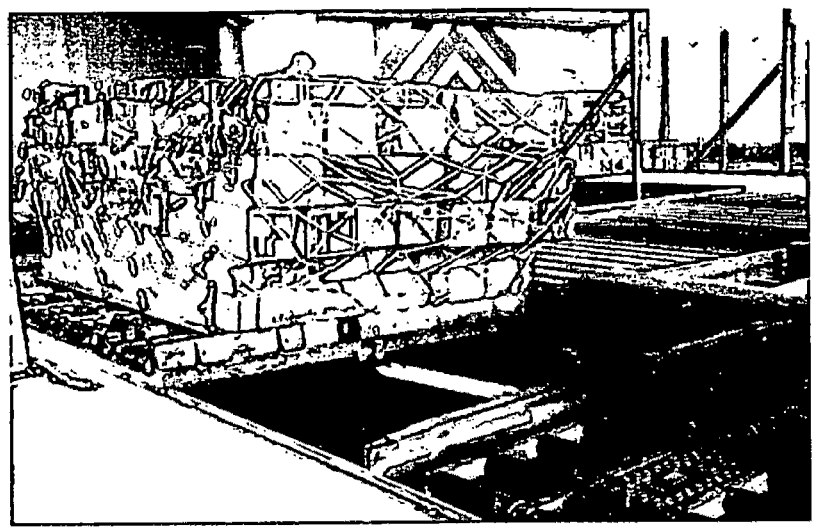
FIG. 1A presents a pallet ULD.
Figure 1B:
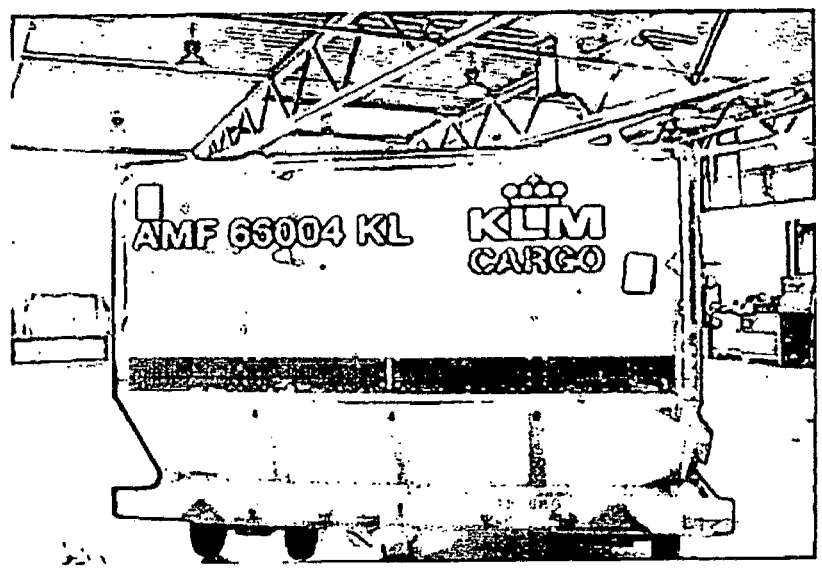
FIG. 1B presents a container ULD.
Figure 2A:
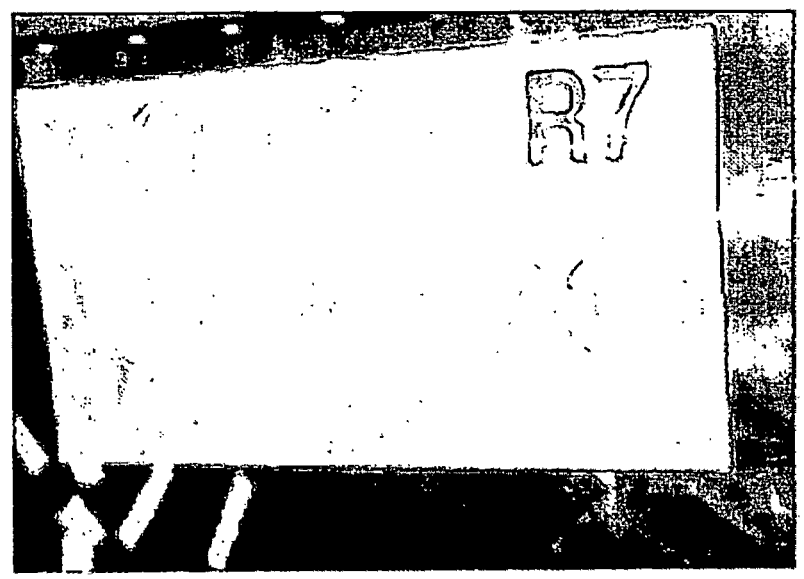
FIG. 2A presents a ULD container number.
Figure 2B:
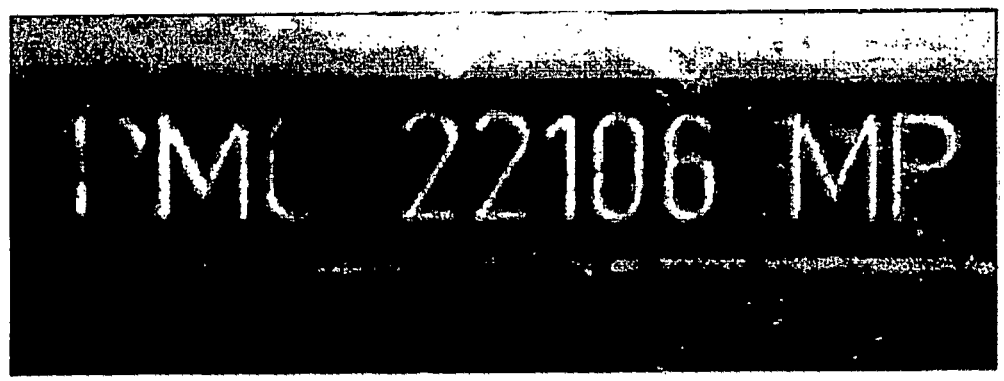
FIG. 2B presents a pallet ULD number.

This application claims priority from U.S. Provisional patent application Ser. No. 61/293,780 filed on 11 of Jan. 2010, the disclosure of which is incorporated herein by reference for all purposes.

In the following description components that are common to more than one figure will be referenced by the same reference numerals.

In addition, unless specifically noted, embodiments described or referenced in the present description can be additional and/or alternative to any other embodiment described or referenced therein.

Figure 3:
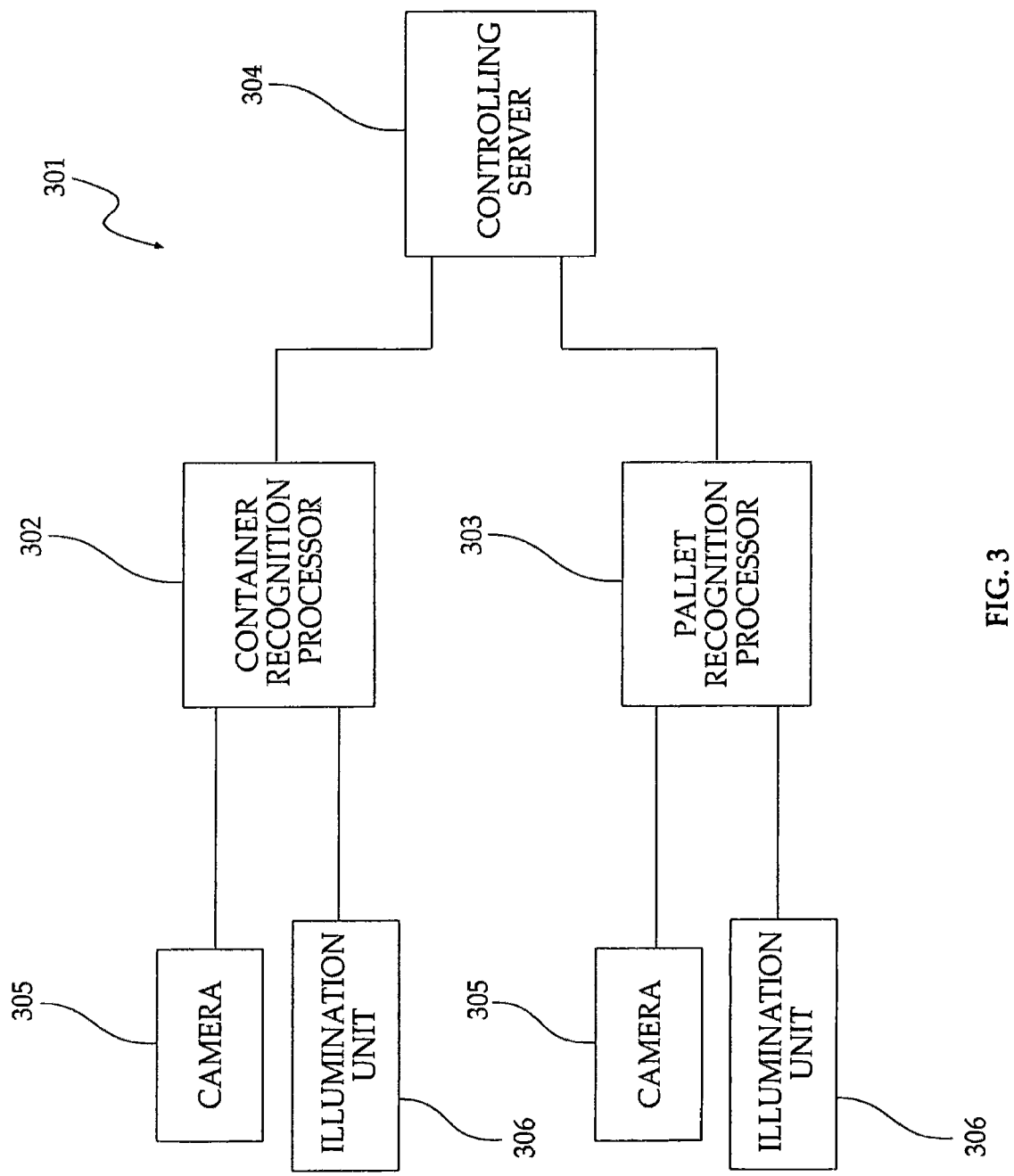
FIG. 3 schematically illustrates a system for identifying and tracking ULD numbers of unit load devices, according to one embodiment of the invention.

FIG. 3 schematically illustrates a system 301 for identifying and tracking ULD numbers of unit load devices, according to one embodiment of the invention. The system, according to the embodiment, includes a number of recognition processors 302 and 303, coupled to a controlling server 304. Each recognition processor handles only one of the two unit forms, i.e., containers or pallets. Thus, 302 represents a container recognition processor while 303 represents a pallet recognition processor.

However, embodiments may exist, in which only one unit form is tracked. Such embodiments may include only one form of a recognition processor, while other forms may be missing. For example, in a system used for recognition of containers alone (unlike pallets), there may be only container recognition processors. Similarly, in a system used for recognition of pallets alone (unlike containers), there may be only pallet recognition processors.

Furthermore, the embodiment depicted in FIG. 3 presents a system in which the recognition processors 302 and 303 are implemented on different machines. This is non-limiting and those versed in the art can appreciate that other embodiments may implement the two processors, or any other number of processors, on a single machine, as applicable to the case. In addition, the existence of a controlling server 304 is not mandatory and in some embodiments the system may not include a controlling server at all. In yet other embodiments it is possible to implement the controlling server and the controlling processors on the same machine, etc.

Each recognition processor is coupled to a camera 305 and to a strobe illuminator 306. Due to simplicity considerations, the embodiment illustrated in FIG. 3 displays one camera and one strobe illuminator coupled to each recognition processor. However, this is not-limiting and in many cases more than one camera and/or more than one strobe illuminator are coupled to a recognition processor. Therefore, according to the embodiment, at least one camera and at least one strobe illuminator are coupled to each recognition processor.

It is noted that each one of the recognition processors (such as 302 and 302) and the controlling server 304 may be a personal computer (PC), a workstation, an embedded controller or any other processing unit capable of controlling and performing the recognition process.

A camera normally has a field of view. This field of view may change, for example, by changing the focal length of the lens (such as with a zoom lens) or by mounting the camera on a movable device that allows changing the position of the camera. The cameras according to the invention are used for capturing images of units and their ULD numbers, and for obtaining information about the units' ULD numbers, information that can be further processed. Therefore, a "scanning zone" or "tracking zone" of a camera is an area, or zone covered by a camera's field of view or part thereof, while units positioned in the scanning zone of the camera can be scanned for ULD tracking and their images can be acquired.

It was mentioned before that a single recognition processor may have at least one camera coupled thereto. Hence, a scanning zone of the recognition processor is the inclusive scanning zones of all the cameras coupled thereto. Similarly, the scanning zone of a system is the inclusive scanning zones of all the recognition processors being part of the system.

It is a goal of the invention to track units loaded onto or unloaded from an airplane. As units are pulled to and from an airplane by a tractor, as was previously explained, one embodiment of the invention requires directing all tractors' traffic via a zone where the recognition system is active, i.e., via the scanning zone of the system.

Figure 4:
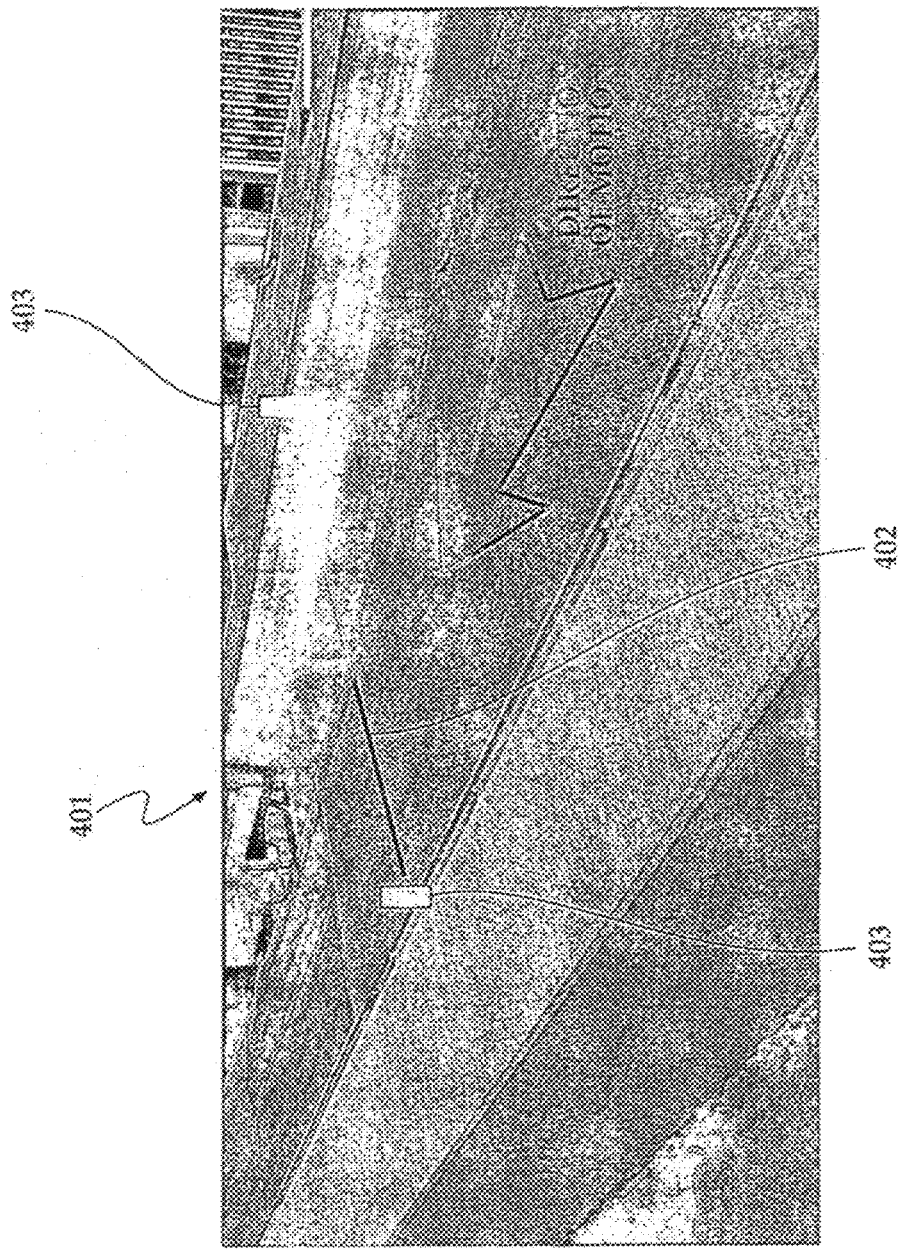
FIG. 4 is a photograph of a lane schematically illustrating sensors, according to one embodiment of the invention.

One embodiment may define "lanes" as paths passing in the system's scanning zone or even covered by the system's scanning zone. When implementing a system in accordance with the described embodiment, it is possible to construct new lanes to which units' traffic should be directed. Alternatively, if there are existing paths previously used for other purposes (e.g., for weighing units), cameras can be installed nearby, hence turning existing paths into lanes according to the present invention. FIG. 4 is a photograph of a lane 401. According to embodiments of the invention, each lane is covered by at least one recognition processor.

When a unit enters a lane, i.e., when it enters the scanning zone of one or more recognition processors, the recognition processors should be activated in order to scan and track the unit's ULD number. Line 402 in FIG. 4 schematically illustrates a detection line respective of the lane. Upon crossing the detection line, activation of the recognition processor (or processors) should be triggered.

There are at least two ways of triggering the processors upon crossing of the detection line, either by using presence detection or by using motion detection.

Presently there are many methods known in the art for detecting presence and/or motion, including usage of infrared (IR) detectors, electro-optic sensors, mass and weight sensors and others. Sensors operating together constitute a "presence sensing module". It is noted that a presence sensing module may include a combination of several types of sensors, or while using other words, a presence sensing module may include least one of infrared detectors, electro-optic sensors and mass and weight sensors. In the embodiment illustrated in FIG. 4, presence detection is performed by the aid of two lane-side magnetic sensors 403. The sensors may be coupled to one or more recognition processors. Electronically, they are wired in parallel, hence each one of them can detect presence, therefore, the two sensors together form one presence sensing module. They are positioned on both sides of the lane, and are connected to the input/output board of the respective recognition processors. The sensors are active while a trolley is present in their field, and they provide a dry contact output to their respective recognition processor, indicative of the presence. When a trolley first crosses the detection line, that is, when the sensors first sense trolley presence, the sensors "rise" thus conveying to the recognition processor an indication that an object is now present ("presence indication"). The sensors continuously indicate that presence continues, until the rear part of the trolley crosses the detection line and the sensors do not detect presence of an object therebetween, i.e., until the trolley exits the sensors' field. When the trolley exits the sensors' field, the sensors "fall", that is, they stop providing "presence indication" to the recognition processors. When presence indication stops, upon exit of the unit, this is considered as "exit indication", while those versed in the art would appreciate that the exit indication is passive. This is non-limiting though, and in other embodiments the presence sensing module may actively convey an exit indication.

It is hence understood that the presence sensing module can detect a presence status for a trolley and/or a unit carried thereby in the scanning zone, wherein the presence status can be either present or absent. The recognition processor, in turn, can obtain information relating to the presence status of the unit, e.g., by actively sampling the presence sensing unit or by passively obtaining information that the presence sensing unit conveys thereto.

It was previously explained that a tractor pulls a few trolleys, each one carrying a pallet or a container. Hence, according to the embodiment, the magnetic sensors are installed at the height of the trolleys, thus detecting passage, or more accurately, presence of a trolley and ignoring the tractor, whose wheels do not activate the magnetic proximity sensor.

Additional or alternative sensors may be placed higher than the trolleys. As, according to the present embodiment, it is the trolley whose presence is detected, while the trolley can be loaded with a pallet or a container, it can be appreciated that the same sensors can detect presence of all units, including containers and pallets.

The latter embodiments, and mainly the photo in FIG. 4, may generate a false impression that a lane must have a physical, static appearance and structure. However, this is not necessarily the case and mobile lanes may exist as well. For example, by installing the cameras on mobile arms or poles, the cameras can be placed in different positions from time to time, thus forming a "mobile lane". Using electro-optical motion and/or presence detection may release the system from the necessity to install sensors' hardware, which may simplify the mobility of the system. Hence, such mobile lanes may be placed, for example, near air planes or in other places which are not static.

Figure 5A:
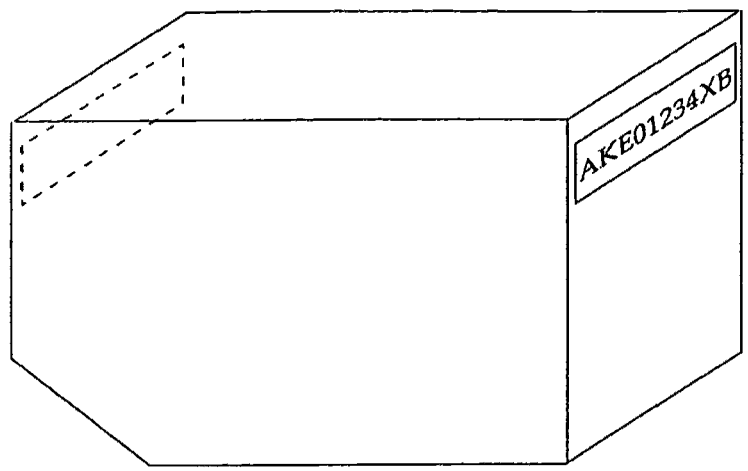
FIG. 5A illustrates an example from IATA standard for the location of ULD numbers on containers.
Figure 5B:
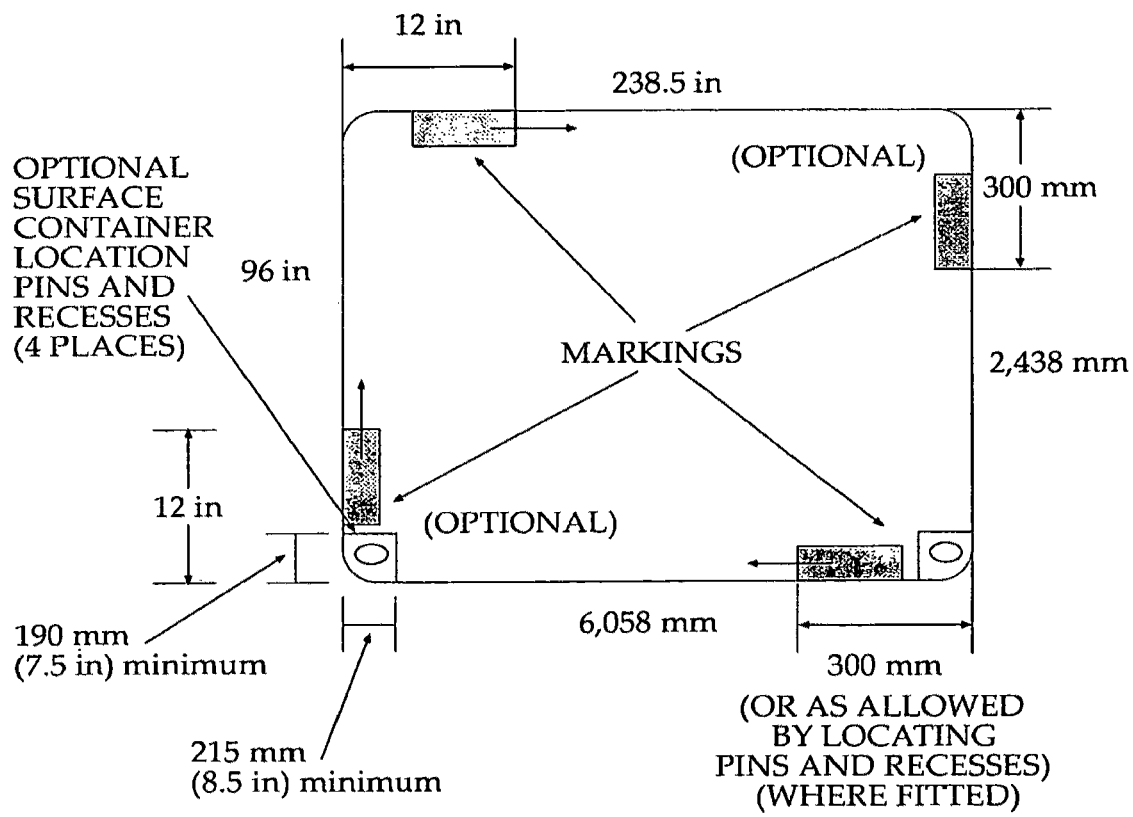
FIG. 5B illustrates an example from IATA standard for the location of ULD numbers on pallets.

Before advancing with describing the systems and methods according to the invention, it is important to note that IATA standard (IATA standard spec 40/0: ULD marking and Identification, Chapters 4-App C) defines the location of the ULD numbers on each type of container and pallet. FIGS. 5A and 5B illustrate examples of the IATA standard for the location of ULD numbers on containers and pallets, respectively. As seen in the figures, on containers, for example, the ULD numbers are marked on at least two sides of the unit, with 100 mm minimum height characters. Possibly all four sides have markings. Pallet types may have ULD numbers on two to four sides of the flat base, while they are marked on the upper face of the pallet's flat base rim.

Figure 6A:
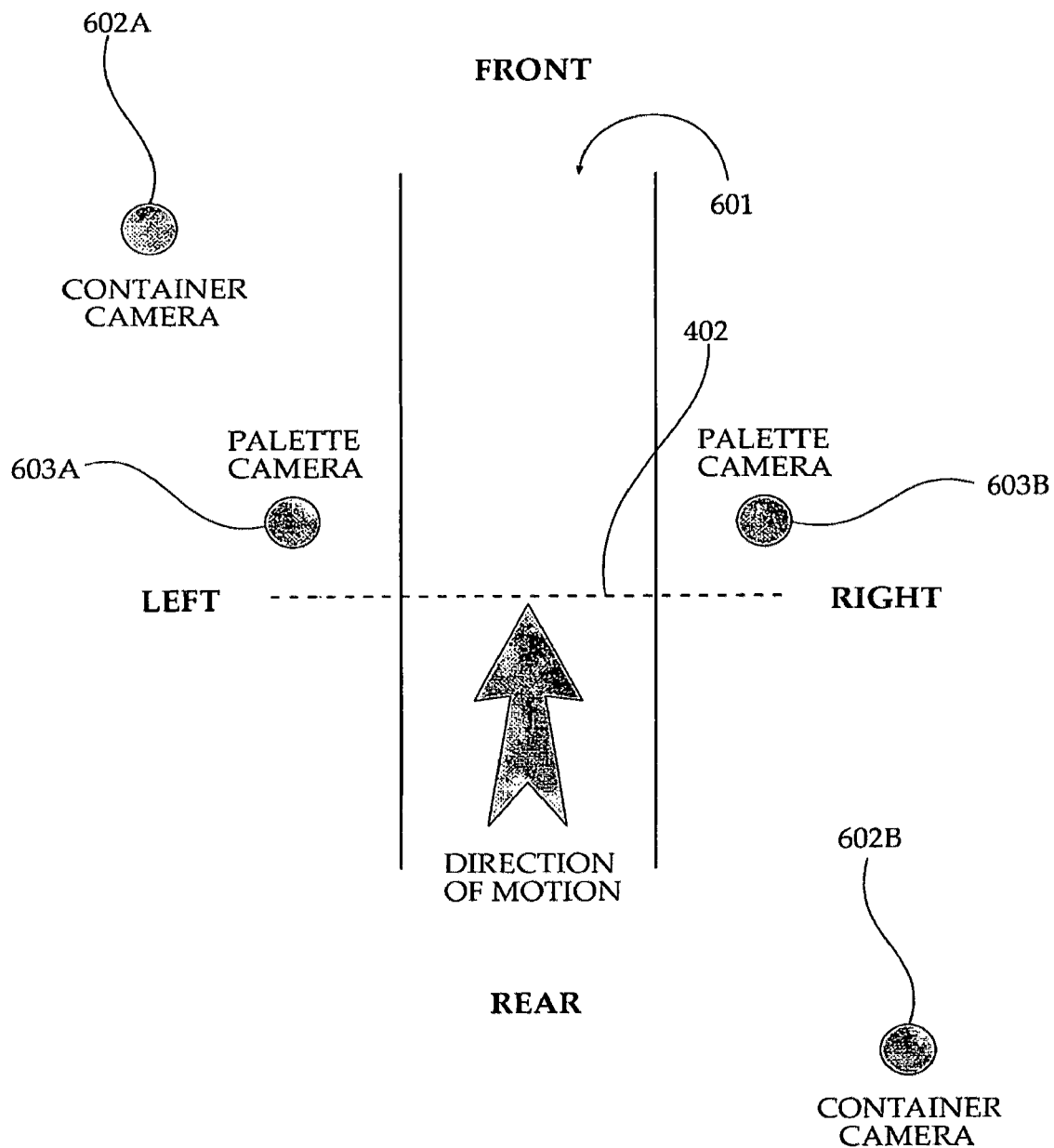
FIG. 6A schematically illustrates a top view of a lane, according to one embodiment of the invention.

FIG. 6A schematically illustrates a top view of a lane 601, according to one embodiment of the invention, wherein this embodiment is configured for scanning containers' as well as pallets' ULD numbers. A camera used for acquiring images of containers constitutes a "container camera". A camera used for acquiring images of pallets constitutes a "pallet camera".

Remembering that potentially ULD numbers are marked on all four sides of a unit and at least on two sides thereof, while the units have a rectangular shape, it should be appreciated that in order to acquire images of all these ULD numbers, images of the four sides of the unit's perimeter should be acquired. Achieving this requires acquiring at least two images taken from two opposite sides of a diagonal line crossing the unit. More specifically, a first image should be acquired for covering two perpendicular sides of the unit, and a second image should be acquired to cover the other two perpendicular sides thereof.

Accordingly, in FIG. 6A two container cameras 602A and 602B are illustrated, whose operation is configured to be triggered when a unit crosses detection line 402. Camera 602A, facing the container's front-left corner, is positioned to acquire images of the ULD number on the unit's front and left sides, while camera 602B, facing the unit's rear-right corner, is positioned to acquire images of the ULD numbers on the unit's rear and right sides.

While considering pallets, the ULD numbers marked thereon are much smaller in size than those marked on containers. Hence, a pallet camera should preferably be positioned at a close distance from the pallet, unlike a container camera that can be positioned further away. Remembering that according to the standard, ULD numbers are marked on two to four sides of the flat base' rim, it should be appreciated that in order to acquire images of all the ULD numbers marked on a pallet, the pallet camera should preferably be oriented substantially vertically downwards.

Hence, in FIG. 6A two pallet cameras 603A and 603B are illustrated. As the system is configured to trigger cameras' operation when a unit crosses detection line 402, one pallet camera 603A is positioned for acquiring images of the ULD number on the unit's front and left sides, while the other pallet camera 603B is positioned for acquiring images of the ULD number on the unit's rear and right sides.

It is noted, though, that the embodiment illustrated in FIG. 6A is non-limiting. For example, it is possible to use any number of cameras applicable for the case. Hence, in cases where reducing the number of cameras in use is important, even at the cost of reducing the system's detection capabilities, it is possible to use only one camera for each unit form, i.e., one pallet camera and/or one container camera. While implementing such a "single-camera for unit form" system, it should be realized that if the ULD number is marked on a place uncovered by the single camera's field of view, it will be missed.

On the other hand, other embodiments may use more than two cameras for each unit's form. For example, it is possible to more than two container cameras and/or more than two pallet cameras.

Furthermore, it was previously explained that in certain embodiments of the system, only one form of units can be recognized, either containers or pallets. Hence, it is generally noted that the system includes at least one container camera and/or at least one pallet camera. In other words, a system according to embodiments of the invention includes at least one camera configured to acquire images of ULD numbers marked on air cargo units.

Figure 6B:
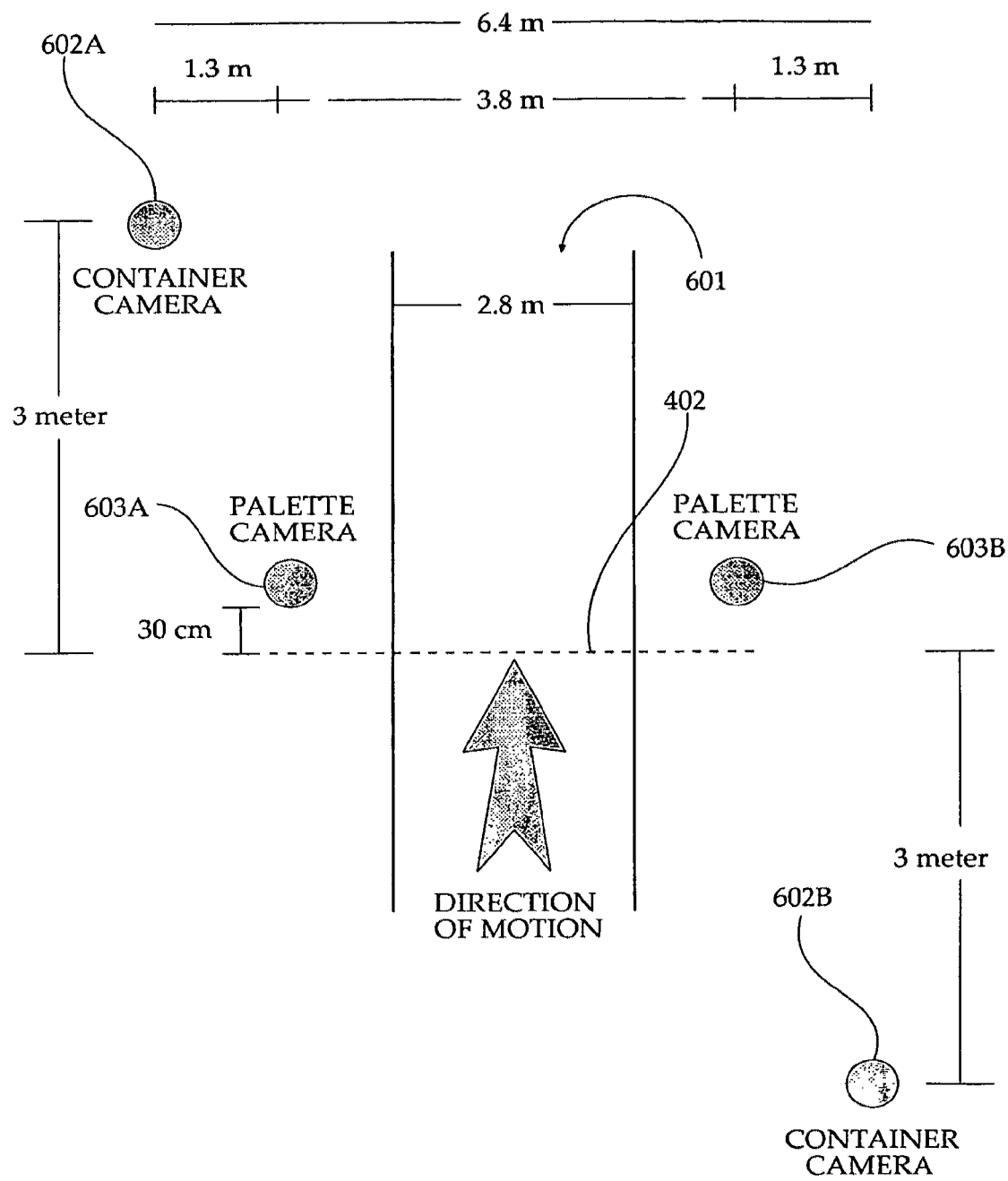
FIG. 6B is the illustration of FIG. 6A with dimensions, according to one embodiment of the invention.

FIG. 6B is the illustration of FIG. 6A with dimensions, according to one embodiment of the invention. The dimensions provided in the figure are provided as a non-limiting example, and a person versed in the art would appreciate that other dimensions may be applicable as well.

Figure 7:
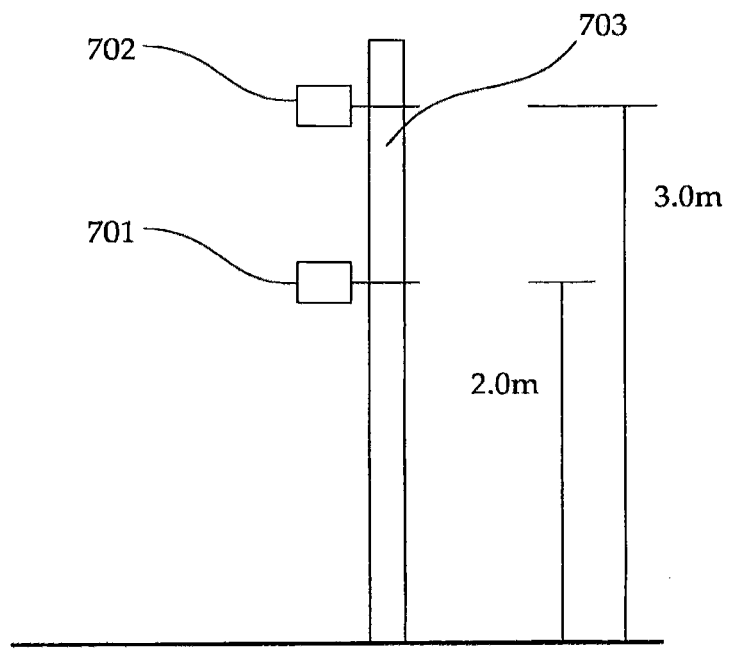
FIG. 7 schematically illustrates a container camera and an illumination unit positioned on a pole, according to one embodiment of the invention.
Figure 8:
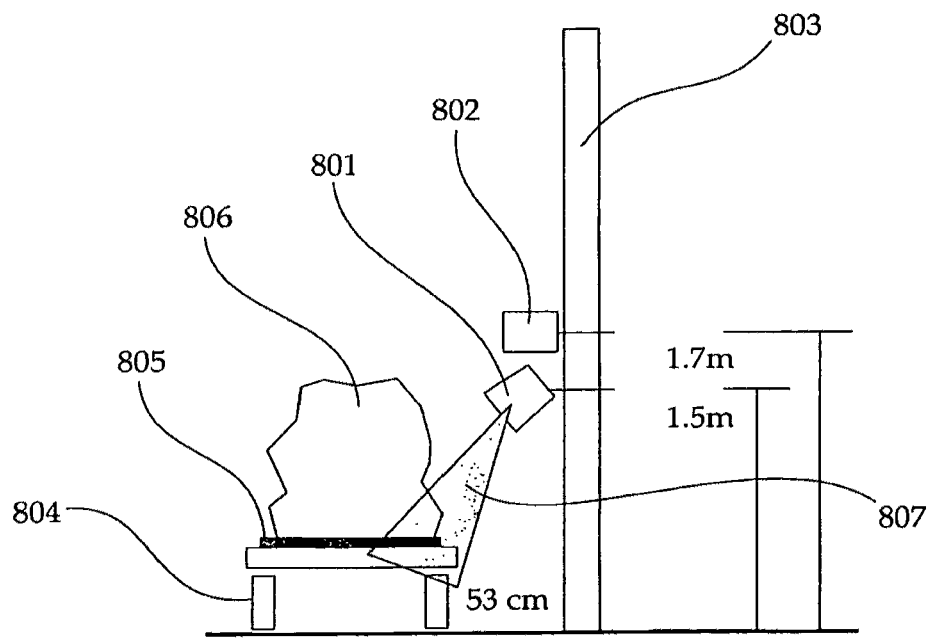
FIG. 8 schematically illustrates a pallet camera and an illumination unit positioned on a pole, according to one embodiment of the invention.

After describing FIGS. 6A and 6B, and the spatial positioning of the cameras while viewed from above, the vertical positioning of the cameras are described as well, according to some embodiments of the invention. FIG. 7 schematically illustrates a container camera 701 and a container illumination unit 702 positioned on a container pole 703, according to one embodiment of the invention, while FIG. 8 schematically illustrates a pallet camera 801 and a pallet illumination unit 802 positioned on a pallet pole 803, according to one embodiment of the invention.

Looking at FIG. 7, it should be appreciated that a container has a known height, determined by the IATA standard, while its ULD number appears on two to four sides of the container. Thus, the ULD numbers are vertically marked on the container. While taking photos of the ULD numbers, it is preferable to acquire the image while the camera's lens is substantially parallel to the ULD number. Hence, in the illustrated embodiment, the container camera 701 is placed horizontally, while its height is determined to match the height of the containers intended to face it, two (2) meters' in this case. Furthermore, In this case the camera is positioned on a pole 703, constituting a "container pole". However, this is non-limiting and non-mandatory. For example, if there is a wall on which it is possible to mount the camera, the container pole may become redundant.

In addition, if container images are taken in low illumination conditions, such as at night or in the shade, an illumination unit 702 can be used, constituting a "container illumination unit". The container illumination units' type in use can vary according to the specific implementation and lighting conditions. For example, it can be a strobe illumination unit, such as a solid state (LED) illumination unit, configured to be pulsed in sync with the camera's aperture, or it can be a continuous lighting unit, such as flood lights. Moreover, it is possible to install different types of illumination units on different container poles controlled by the system, in different lanes or even in the same lane. It is also possible to install more than one container illumination unit on a single pole if appropriate to the case, of the same or of different illumination unit types.

Care should be taken to make sure that the distance between the container illumination unit and the camera is neither too short nor too long, thus resulting in extremely underexposed or extremely overexposed images. In the example illustrated in FIG. 7, the container illumination unit is positioned one meter above the container camera.

Turning now to FIG. 8, and remembering that on pallets the ULD numbers are marked on the rim of the flat base facing up, it can be appreciated that in order to take a photo of ULD numbers marked on a pallet, the pallet camera should be directed at the pallets rims. In the figure, trolley 804 carries a pallet 805, on which cargo 806 is laid. The camera's field of view is represented by triangle 807.

Similar to the case of the container camera, in the presently illustrated embodiment the pallet camera 801 is also positioned on a pole 803, constituting a "pallet pole". However, this is non-limiting and non-mandatory. For example, if there is a wall on which it is possible to mount the camera, the pallet pole may become redundant. There is no limitation forcing all the container poles to be similar, and there is no limitation that forces all the pallet poles to be similar to each other.

In the example illustrated in the figure, the trolley's height is 53 centimeters, as indicated in the figure. Knowing the height of the trolley (and hence also of the ULD number on the pallet), the distance of the trolley from the pole, and the camera height, the camera angle can be calculated. It should be appreciated though that if the angle between the camera and the camera pole is too wide, the acquired image of the ULD number may be distorted and possibly also inappropriate for OCR processing. In the example illustrated in FIG. 8, the camera height is 1.5 meters.

Further to understanding the embodiments presented by FIGS. 7 and 8, it should be appreciated that according to these embodiments the cameras are placed in angles and heights correlated with the expected position of the ULD number marking on the air cargo units.

Because of the small size of the pallet's ULD number and the narrow field of view, a high shutter speed is required and hence usage of an illumination unit 802, constituting a "pallet illumination unit", is mandatory. The pallet illumination units' type in use can vary according to the specific implementation and lighting conditions. For example, it can be a strobe illumination unit, such as a solid state (LED) illumination unit, configured to be pulsed in sync with the camera's aperture, or it can be a continuous lighting unit, such as flood lights. Moreover, it is possible to install different types of illumination units on different pallet poles controlled by the system, in different lanes or even in the same lane. It is also possible to install more than one pallet illumination unit on a single pole if appropriate to the case, of the same or of different illumination unit types. Furthermore, pallet illumination units can be identical or different in type from container illumination units in use in the same system.

Care should be taken to make sure that the distance between the pallet illumination unit and the pallet camera is neither too short nor too long, thus resulting in extremely underexposed or extremely overexposed images. In the example illustrated in FIG. 8, the pallet illumination unit is positioned twenty (20) centimeters above the pallet camera.

Having described how cameras and illumination units are installed for acquiring pallets and container images, attention will now be drawn to the cameras used by the system. According to one non-limiting embodiment, digital still cameras are used, configured to acquire black and white images. However, in other embodiments the digital cameras may be configured to acquire colour images, while in yet another embodiment the cameras may be video cameras.

Furthermore, there may be differences in the characteristics of the cameras used to acquire images of pallets and containers. For example, container cameras should have one (1) megapixels resolution or higher, while pallet cameras are required to have at least four (4) megapixels resolution. Container cameras may be configured with a medium shutter speed (such as $\frac{1}{1000}$) and a wide field of view (e.g., 3.5 meters by 2.5 meters, with an 8 mm lens), while pallet cameras may be configured with a high shutter speed (e.g. $\frac{1}{4000}$) and narrow field of view (for example, 80 centimeters by 60 centimeters).

Figure 9:
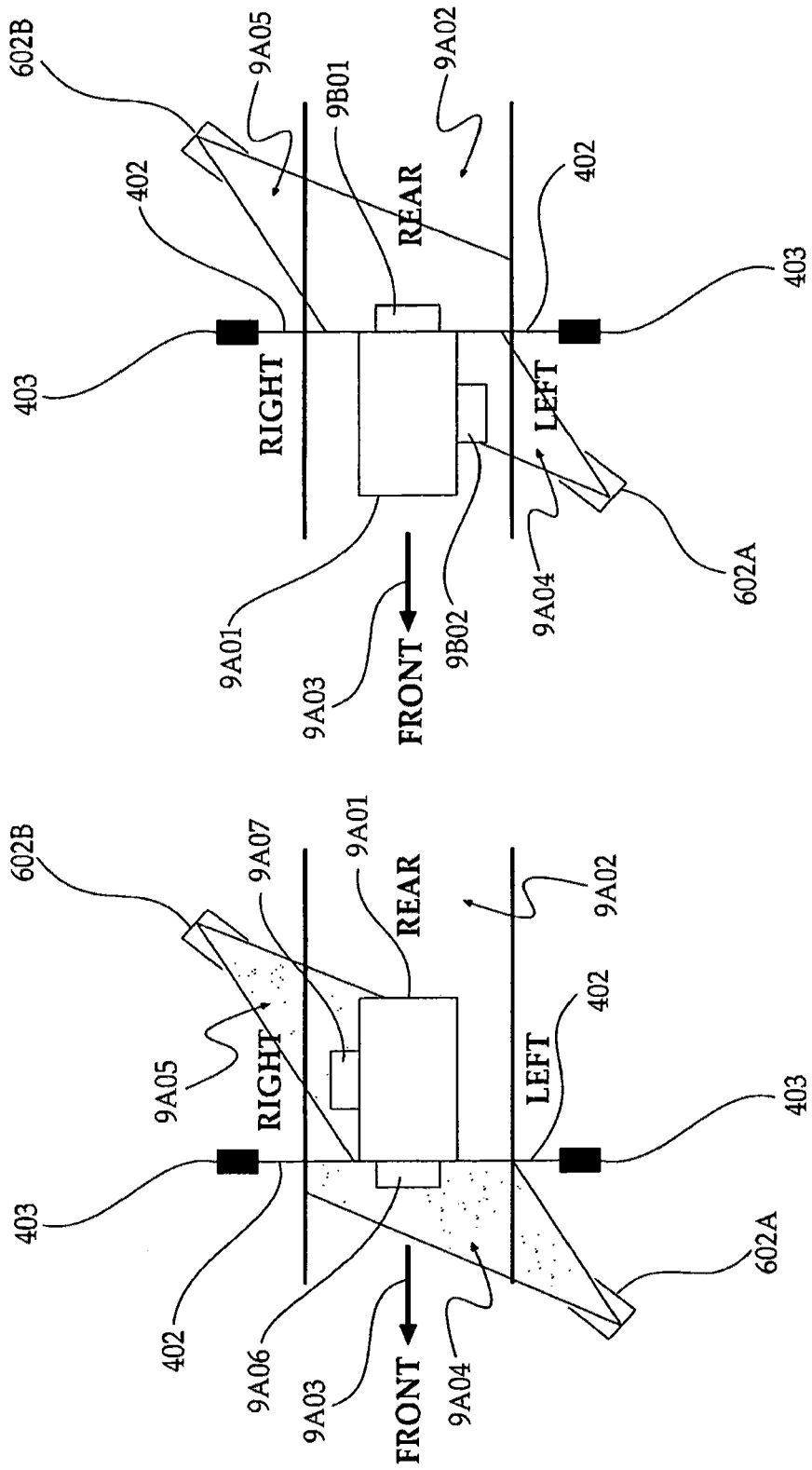
FIGS. 9A and 9B schematically illustrate acquiring images of ULD numbers marked on a container, according to one embodiment of the invention.

After understanding the examples explaining how cameras are positioned in a lane (e.g., by looking at FIG. 6A and reading the description relating thereto) and how each camera can be installed in its position (e.g., by looking at FIGS. 7 and 8 and their respective description), the present invention explains also how to acquire images of ULD numbers marked on moving containers and pallets, according to embodiments of the invention. Hence, attention is drawn now to FIGS. 9A and 9B, schematically illustrating acquiring images of ULD numbers 9A06 and 9A07, marked on a container 9A01, according to one embodiment of the invention. FIG. 9A illustrates trolley 9A01 moving along a lane 9A02. The arrow 9A03 marks the direction of motion. Although not illustrated, it should be known that the trolley carries a container. In the figure the trolley reaches and crosses detection line 402, i.e., it enters the field of the presence sensors, such as sensors 403 (see FIG. 4). The sensors in this case are coupled to a container recognition processor 302 (see FIG. 3) and provide a presence indication thereto. The container recognition processor 302 is not illustrated in FIG. 9A. The container recognition processor is coupled to two container cameras, such as 602A and 602B (see FIG. 6A) positioned in the lane. Hence, upon sensor rise, the container recognition processor can trigger activation of the container cameras.

The triangles 9A04 and 9A05 represent the field of view of the two container cameras 602A and 602B, respectively. The field of view of container camera 602A covers all, or at least most of the container's front side and part of the container's left side, while the field of view of container camera 602B covers most, and possibly even all of the container's right side and part of its rear side. Hence, it can be seen that upon sensor rise, container camera 602A can acquire an image of the ULD number 9A06 marked on the unit's front side, while container camera 602B can acquire an image of the ULD number 9A07, marked on the right side of the unit.

FIG. 9B illustrates trolley 9A01 moving along the same lane 9A02 at sensor fall. In this figure the trolley's rear side reaches and crosses detection line 402, i.e., it exits the field of sensors 403. Hence, upon sensor fall, the container recognition processor obtains an indication that presence has terminated, whereupon it can trigger activation of container cameras 602A and 602B. Now, it can be seen that the ULD numbers 9B01 and 9B02, marked on the container's left side and rear side, respectively, are in the field of view of container cameras 602A and 602B, and hence their images can be acquired.

Before continuing to describe how pallet ULD numbers are acquired, it is important to remember that a trolley may carry twin containers. In this case the embodiment described in FIGS. 9A and 9B may acquire images of two different ULD numbers, each marked on a separate container out of the twins.

Figure 10:
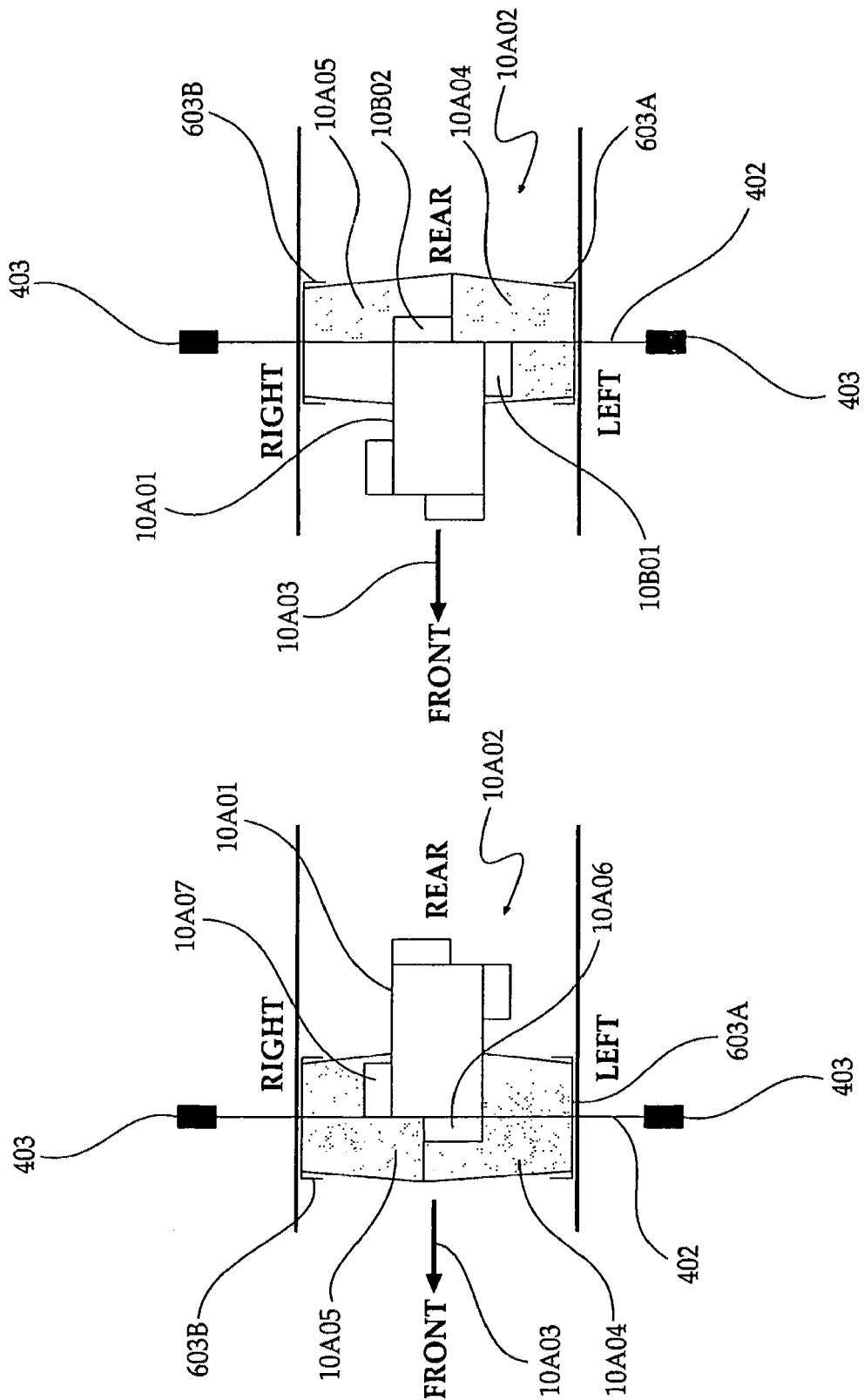
FIGS. 10A and 10B schematically illustrate acquiring images of ULD numbers marked on a pallet, according to one embodiment of the invention.

FIGS. 10A and 10B schematically illustrate acquiring images of ULD numbers marked on a pallet 10A01, according to one embodiment of the invention. FIG. 10A illustrates trolley 10A01 carrying a pallet and moving along a lane 10A02. The arrow 10A03 marks the direction of motion. In the figure the trolley reaches and crosses detection line 402, i.e., it enters the field of the presence sensors, such as sensors 403 (see FIG. 4). The sensors in this case are coupled to a pallet recognition processor 303 (see FIG. 3) and provide a presence indication thereto. The pallet recognition processor 303 is not illustrated in FIGS. 10A and 10B. The pallet recognition processor is coupled to two pallet cameras, such as 603A and 603B positioned in or near the lane. Hence, upon sensor rise, the pallet recognition processor can trigger activation of the pallet cameras.

The rectangles 10A04 and 10A05 represent the field of view of the two pallet cameras 603A and 603B, respectively. It is explained that normally the field of view of a camera is illustrated as a triangle, however, due to the narrow angle characterizing the pallet camera, rectangles are a good approximation. The field of view of pallet cameras 603A and 603B covers a smaller area around the pallet corners, and faces downwards. Hence, it can be seen that upon sensor rise, pallet camera 603A can acquire an image of the ULD number 10A06 marked on the unit's front side, while pallet camera 603B can acquire an image of the ULD number 10A07, marked on the right side of the unit.

FIG. 10B illustrates the pallet carrying trolley 10A01 moving along the same lane 10A02 at sensor fall. In this figure the trolley's rear side reaches and crosses detection line 402, i.e., it exits the field of sensors 403. Hence, upon sensor fall, the pallet recognition processor obtains an indication that presence has terminated, whereupon it can trigger activation of pallet cameras 603A and 603B. Now, it can be seen that the ULD numbers 10B01 and 10B02, marked on the pallet's left side and rear side, respectively, are in the fields of view of pallet cameras 603A and 603B, and hence their images can be acquired.

Hence, it is appreciated that the two container cameras 602A and 602B are positioned to acquire together images of at least two sides of said air cargo unit. Likewise, the two pallet cameras 603A and 603B are also positioned to acquire together images of at least two sides of said air cargo unit.

The embodiments presented with reference to FIGS. 9A, 9B, 10A and 10B describe each one event, or trigger. Corresponding to this event, two images of the unit are acquired, one from the right camera and the other from the left camera: the system acquires two images (from the left and right cameras) upon sensor rise, and then it acquires two images (from the left and right cameras) upon sensor fall. This is non-limiting and other embodiments can operate differently. For example, in one embodiment only one trigger is used for acquiring images, e.g., either on sensor rise or on sensor fall. In another alternative embodiment, the cameras or part thereof can be configured to operate in continuous shooting mode upon obtaining a trigger, thus acquiring a series of images that may improve the OCR processing. Another embodiment can shoot a video clip of the moving unit, etc.

Furthermore, in the description provided so far with reference to FIGS. 9A, 9B, 10A and 10B, illumination units were not mentioned. It is noted that such illumination units were not described in order to keep the description simple. A person versed in the art of photography is aware that proper illumination conditions are critical, and hence it is possible to add operation of an illumination unit to the system, as applicable to the case.

In addition, it can be appreciated that resemblance exists between the operation described in FIG. 9A and FIG. 10A, i.e., at sensors' rise. Likewise resemblance exists between the operation described in FIGS. 9B and 10B, i.e., at sensors' fall. The main differences within each "couple" are the angles of view of each camera, i.e., a pallet camera may use another field of view, compared to a container camera. Hence, the description below refers to a "recognition processor" instead of describing, e.g., a container recognition processor and/or a pallet recognition processor. If differences exist between the cases, this is specifically mentioned.

Figure 11:
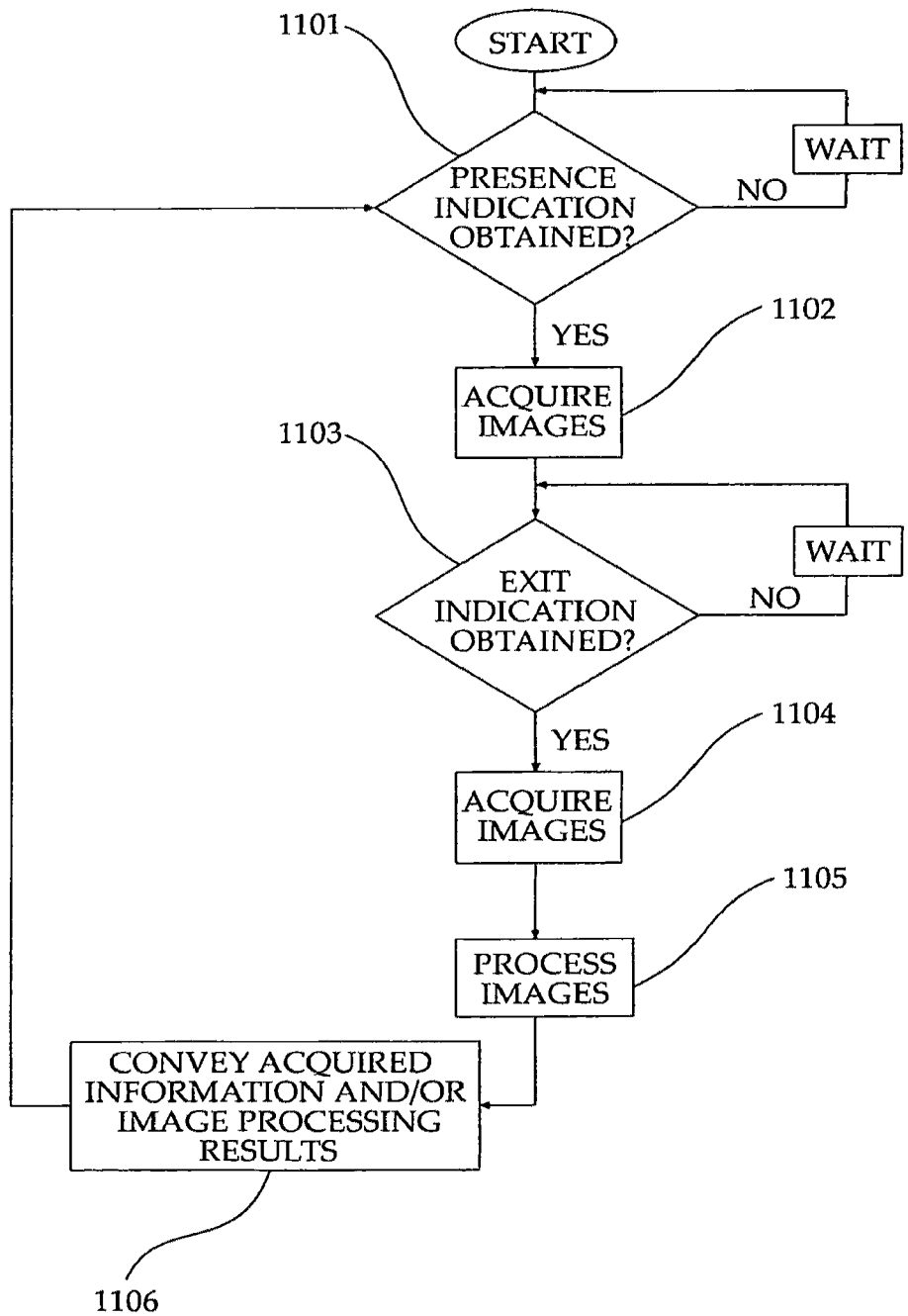
FIG. 11 is a flowchart presenting the main operations done in a recognition processor, according to one embodiment of the invention.

FIG. 11 is a flowchart presenting the main operations performed in a recognition processor, according to one embodiment of the invention. The flowchart is directed towards recognition processors managing recognition of units passing in a single lane. However this is non-limiting and the recognition processor can be used for managing recognition in more than one lane at the same time.

Upon start, on 1101 the recognition processor waits for presence indication, further thereto, on 1102 it triggers operation of the cameras positioned in the lane. Triggering the cameras may lead to acquiring of one or more images of the unit. Then on 1103, the recognition processor waits for an exit indication, and upon obtaining it, on 1104, it triggers the cameras again to acquire one or more images of the unit. It is noted that the number of images acquired on 1102 is not necessarily identical to the number of images acquired on 1104.

Furthermore, on 1105 the recognition processor processes the images acquired on 1102 and 1104, including extraction of information relating thereto. The information relating to the acquired images may be a ULD number appearing in the images (i.e., the string), it may include another or alternative information, such as graphical information relating to the unit (e.g., the colour of the ULD number marked thereon), the location of the ULD marking on the unit, etc., and it may also include an indication that the recognition processor could not extract a ULD number from the acquired images. It was explained before trolleys can carry twin containers, and it is noted here that in these cases, two ULD numbers will be extracted on 1105.

On 1106 the information relating to the acquired images is further conveyed, e.g., to the controlling server 304, for additional processing and/or storage. Then the recognition processor returns to 1101, whereupon it awaits additional presence indications. It is noted that the information relating to the acquired images can include data such as a ULD number, it can include statistical data such as confidence values, it can include copies of the acquired images or part thereof, etc. Furthermore, instead of directly conveying the information relating to the acquired images, the controlling server can, for example, store the information in a database accessible to other processors and/or servers as well, and then convey a key that allows access to the information stored in the database. That is, on 1106 the recognition processor can convey information relating to the acquired images, and/or data indicative of this information.

The embodiment presented by FIG. 11 is non-limiting and alternatives are allowed when applicable. For example, the flow chart presents a serial process, in which images are acquired and then processed for extracting information therefrom. In an alternative embodiment image processing may start in parallel to acquiring images. Hence, for example, the images acquired on 1102 can be processed while the recognition processor waits for the exit indication. Alternatively, image processing can be skipped, while on 1106 the recognition processor can further convey the acquired images and/or any other acquired information. In the latter alternative embodiment, wherein the recognition processor does not perform image processing, it is appreciated that it can be performed, instead, by the controlling server 304 for example, although this may introduce a delay. Other embodiments can trigger image acquiring only upon obtaining a presence indication or an exit indication instead of acquiring images upon obtaining both indications, etc.

The embodiment described with reference to FIG. 11, or any alternative thereof, can be used in a recognition processor to control a system described by any one of the embodiments described above.

Figure 12:
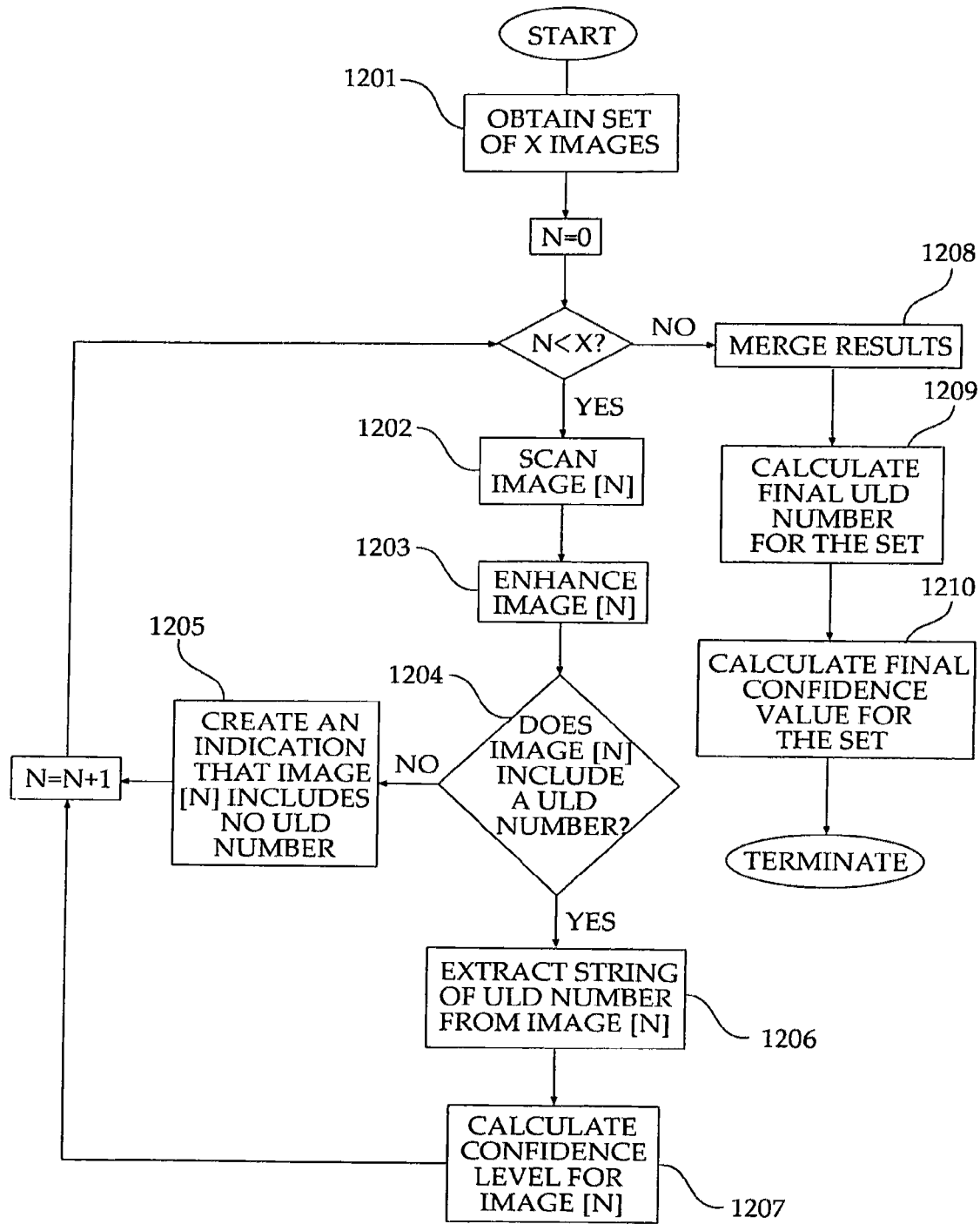
FIG. 12 is a flowchart presenting image processing in greater details, according to one embodiment of the invention.

FIG. 12 is a flowchart presenting image processing 1105 in greater details, according to one embodiment of the invention. Further to obtaining a set of images on 1201, for each image in the set, on 1202 the recognition processor scans the image, on 1203 it enhances the image, and on 1204 it detects whether the image includes a ULD number. If no ULD number is included in the image, on 1205 an indication therefor is created and the recognition processor advances to processing the other images in the set. On the other hand, if a ULD number is detected on 1204, on 1206 the recognition processor extracts the ULD number's string from the image using any applicable OCR method, as the method described in US 2008/0131001 mentioned in the background of the present invention and other OCR methods, and on 1207 it calculates a confidence level for the image.

After processing all the images in the set, on 1208 results of all the images are merged, on 1209 the recognition processor calculates a final ULD number for the whole set, and on 1210 it calculate a confidence value for the final ULD number obtained in 1209, based on the number of repetitions and quality of the recognized letters and numbers.

If the confidence value is very low (e.g., lower than a certain threshold value), or if the recognition processor could not detect a ULD number in any one of the images in the set (e.g., on 1204), it can be appreciated that on 1209, for example, the recognition processor may provide an indication that the set of images include no ULD number. This indication, or otherwise the final ULD number and confidence value calculated on 1209 and 1210, may form part of the information relating to the acquired images conveyed on 1106.

It was previously explained, with reference to FIG. 3, that according to certain embodiments, a container recognition processor and a pallet recognition processor are coupled to a controlling server, to whom they can convey information relating to the acquired images. In a lane combining container and pallet cameras, when presence of a trolley is sensed, it is impossible to determine in advance whether the trolley carries a container or a pallet, and hence all cameras are operated to acquire images if the crossing trolley. The respective container and pallet recognition processors are operated accordingly, and both convey information relating to the acquired images to the controlling server. However, since a trolley can carry either a container or a pallet, and not both, it can be appreciated that only one of the recognition processors, i.e., either the container recognition processor or the pallet recognition processor will convey thereto information that includes a ULD number or data indicative thereof. Hence, the controlling server can perform arbitration, determining whether the load on the trolley is a container or a pallet, or even possibly neither a container nor a pallet.

The server can perform the arbitration, e.g., based on confidence values obtained as part of the information relating to acquired images. However, sometimes, the information relating to acquired images is not significant and the server may require additional tools in order to act as an arbiter. Such tool can be a database storing copies of images and other information relating to acquired images obtained in the past from the controlling servers. The server can match the presently obtained information relating to acquired images to information stored in the database, thus using this stored information in order to improve the OCR results and allow arbitration. Therefore the server can also store information in the database, thus supporting future usage thereof.

Figure 13:
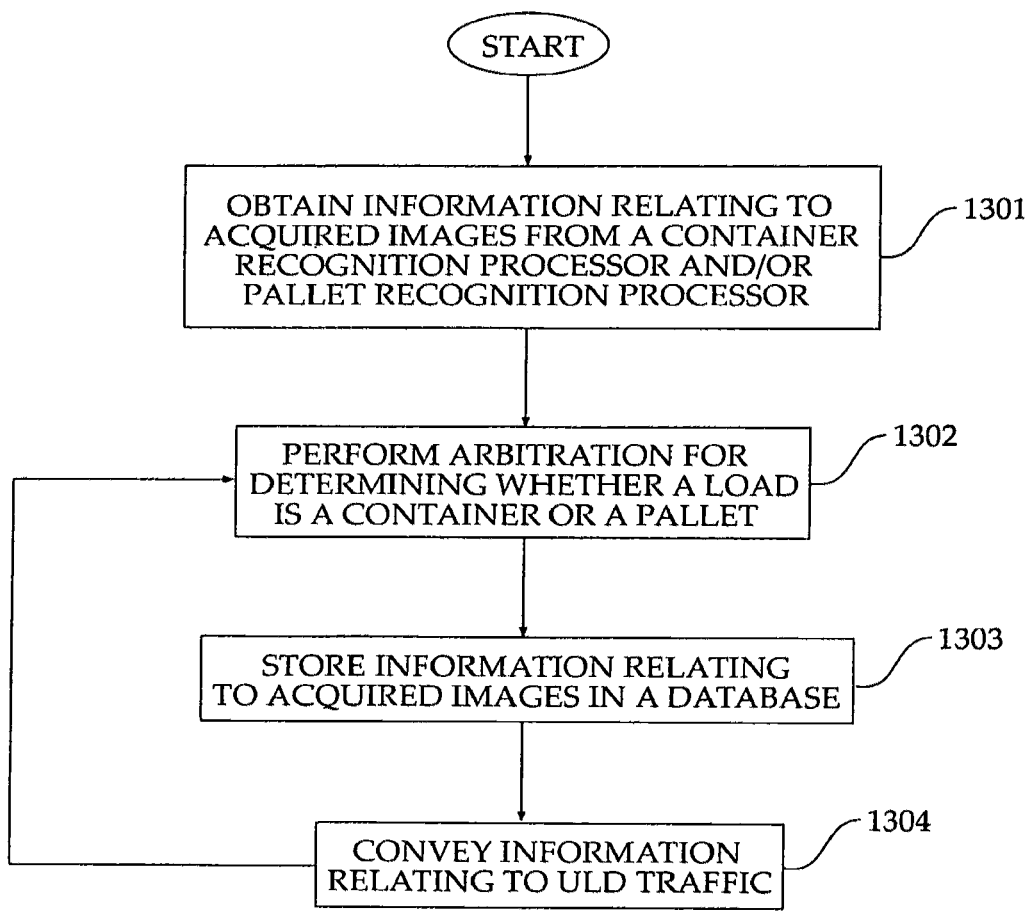
FIG. 13 is a flowchart illustrating operations performed by a controlling server, according to one embodiment of the invention.

FIG. 13 is a flowchart illustrating operations performed by a controlling server, according to one embodiment of the invention. On 1301 the controlling server obtains information relating to acquired images from a container recognition processor and/or a pallet recognition processor, both recognition processors track the same lane. On 1302 the server performs arbitration in order to determine the type of load carried by the trolley. As was previously explained, the server can use information stored in a database in order to improve its performance as an arbiter, although this is non-mandatory. On 1303 the server may store the information relating to acquired images, or part thereof, in the database, and on 1304 it further conveys information relating to ULD traffic, e.g., to a client computer that may belong to a customer.

Understanding this it should be appreciated that the controlling server may be coupled to more than one container and pallet recognition processors, and that it can integrate recognition processors tracking multiple lanes. This way the controlling server may be used as a single point of contact between the system according to the invention and between client processors.

It will be understood that parts of the system according to the invention may be a suitably programmed computer. Likewise, the invention contemplates a computer program being readable by a computer for executing methods of the invention. The invention further contemplates a machine-readable memory tangibly embodying a program of instructions executable by the machine for executing methods of the invention.

The invention claimed is:

1. A system comprising:
a first camera to acquire one or more images of a container;
a second camera to acquire one or more images of a pallet;
a presence sensing module to detect a presence status of an air cargo unit in a scanning zone, the presence status having a value of present or absent; and
a recognition processor coupled to the presence sensing module and to at least one of the first camera or the second camera, and to:
obtain from the presence sensing module information relating to the presence status of the air cargo unit;
trigger the first camera and the second camera to acquire images based on a change in the value of the presence status, one or more of the images having a confidence value;
process the images from the first camera and the images from the second camera to perform arbitration, the arbitration determining whether the air cargo unit is a container, a pallet, or neither a container nor a pallet;
match, based on at least one confidence value, information relating to the acquired images with stored information relating to previously acquired images; and
improve the arbitration based on the matching.

2. The system of claim 1, wherein the air cargo unit is a container and the at least one camera includes at least one container camera.

3. The system of claim 1, wherein the air cargo unit is a pallet and the at least one camera includes at least one pallet camera.

4. The system of claim 1, wherein the air cargo unit is one of a pallet and a container, and the at least one camera includes at least one pallet camera and at least one container camera.

5. The system of claim 1, wherein the presence sensing module includes magnetic sensors.

6. The system of claim 5, wherein the magnetic sensors are two magnetic sensors wired in parallel.

7. The system of claim 5, wherein the air cargo unit is carryable by a trolley and the magnetic sensors are installed at the height of the trolley.

8. The system of claim 1, wherein the presence sensing module includes at least one of infrared detectors, electro-optic sensors and mass and weight sensors.

9. The system of claim 1, wherein the at least one of the first camera and the second camera includes two cameras positioned to acquire together images of at least two sides of said air cargo unit.

10. A method comprising:
obtaining information relating to a presence status of an air cargo unit;
triggering one or more cameras to acquire one or more images based on a change in a value of the presence status, at least one of the one or more images having a confidence value;

processing the images to perform arbitration, the arbitration being operative to determine whether the air cargo unit is at least one of (a) a container, (b) a pallet, or (c) neither a container nor a pallet;

matching, based on the confidence value, information relating to the one or more images with stored information relating to previously acquired images; and improving the arbitration based on the matching.

11. The method of claim 10, wherein triggering one or more cameras to acquire one or more images comprises acquiring a set of images, and wherein processing the images comprises (a) processing each image in the set and (b) merging results of the processing of each image to calculate a final ULD number.

12. The system of claim 1, wherein the recognition processor is further configured to extract graphical information relating to the air cargo unit.

13. The system of claim 12, wherein the graphical information comprises a color of the ULD number.

14. The system of claim 12, wherein the graphical information comprises a location of the ULD number on the air cargo unit.

15. The system of claim 1, wherein the confidence value is calculated based on the quality of the recognized characters in the ULD number.

16. A system comprising:
- a container camera to acquire one or more images of a container;
- a pallet camera to acquire one or more images of a pallet;
- a presence sensing module to detect a presence status of an air cargo unit in a scanning zone, the presence status can have a value being one of present or absent;
- a container recognition processor coupled to the presence sensing module and to the container camera;
- a pallet recognition processor coupled to the presence sensing module and to the pallet camera; and
- a controlling server in communication with the container recognition processor and the pallet recognition processor and to:
  - obtain from the presence sensing module information relating to the presence status of the air cargo unit;
  - trigger the container camera and the pallet camera to acquire images based on a change in the value of the presence status, one or more of the images having a confidence value;
  - process the images from the container camera and the images from the pallet camera to perform arbitration, the arbitration determining whether the air cargo unit is a container, a pallet, or neither a container nor a pallet;
  - match, based on at least one confidence value, information relating to the acquired images with stored information relating to previously acquired images; and
  - improve the arbitration based on the matching.

17. The system of claim 16, wherein the container camera comprises a first container camera and a second container camera.

18. The system of claim 17, wherein the first container camera is oriented to acquire one or more images of a first two sides of a rectangular container, and the second container camera is oriented to acquire one or more images of a second two sides of the rectangular container that are not the first two sides.

19. The system of claim 6, wherein the air cargo unit is carryable by a trolley and the magnetic sensors are installed at the height of the trolley.

* * * * *